United States Patent
Bostrom et al.

(10) Patent No.: US 7,594,675 B2
(45) Date of Patent: Sep. 29, 2009

(54) AIRBAG SYSTEM

(75) Inventors: Ola Bostrom, Alingsas (SE); Jack Johansson, Landvetter (SE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 11/949,308

(22) Filed: Dec. 3, 2007

(65) Prior Publication Data
US 2008/0129020 A1 Jun. 5, 2008

Related U.S. Application Data

(63) Continuation of application No. PCT/EP2006/004743, filed on May 18, 2006.

(30) Foreign Application Priority Data

Jun. 1, 2005 (DE) .................. 10 2005 025 553
May 18, 2006 (EP) ............... PCT/EP2006/004743

(51) Int. Cl.
*B60R 21/20* (2006.01)

(52) U.S. Cl. ............................ 280/730.2; 280/728.2

(58) Field of Classification Search ............ 280/728.2, 280/730.2, 743.2
See application file for complete search history.

(56) References Cited

U.S. PATENT DOCUMENTS

| 3,981,520 | A | * | 9/1976 | Pulling | 280/730.2 |
| 5,172,790 | A | * | 12/1992 | Ishikawa et al. | 180/268 |
| 5,222,761 | A | * | 6/1993 | Kaji et al. | 280/730.2 |
| 5,312,131 | A | * | 5/1994 | Kitagawa et al. | 280/730.2 |
| 5,316,337 | A | * | 5/1994 | Yamaji et al. | 280/743.1 |
| 5,464,250 | A | * | 11/1995 | Sato | 280/743.1 |
| 5,931,498 | A | * | 8/1999 | Keshavaraj | 280/743.1 |
| 6,966,576 | B1 | * | 11/2005 | Greenstein | 280/730.1 |
| 7,222,877 | B2 | * | 5/2007 | Wipasuramonton et al. | 280/730.1 |

FOREIGN PATENT DOCUMENTS

DE 100 07 343 A1 2/2000

\* cited by examiner

*Primary Examiner*—Paul N. Dickson
*Assistant Examiner*—Timothy Wilhelm
(74) *Attorney, Agent, or Firm*—Brinks Hofer Gilson & Lione

(57) ABSTRACT

The invention relates to an airbag arrangement in a motor vehicle comprising an airbag and a gas generator, which fills the airbag with gas after being activated, the airbag being arranged between two neighboring seating positions for vehicle occupants. The airbag is arranged in an openable lid of a center console or in an openable armrest.

15 Claims, 4 Drawing Sheets

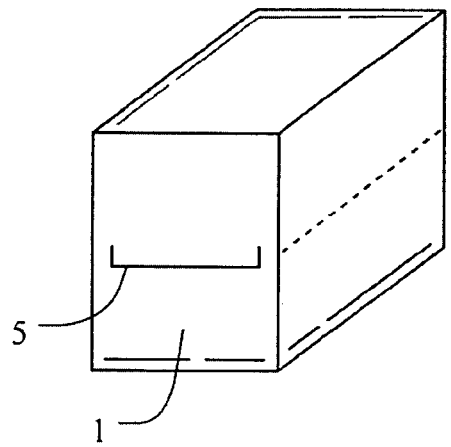
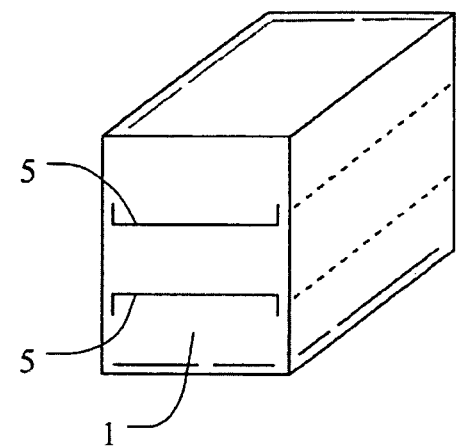
Fig. 5a
Fig. 5b
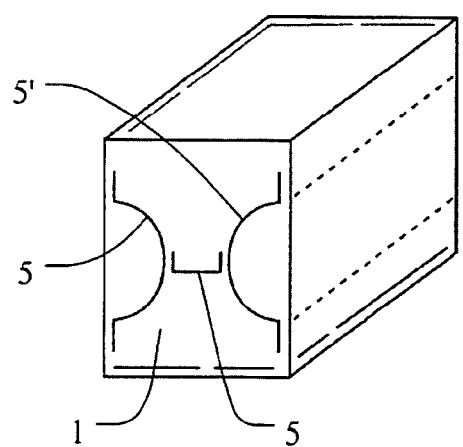
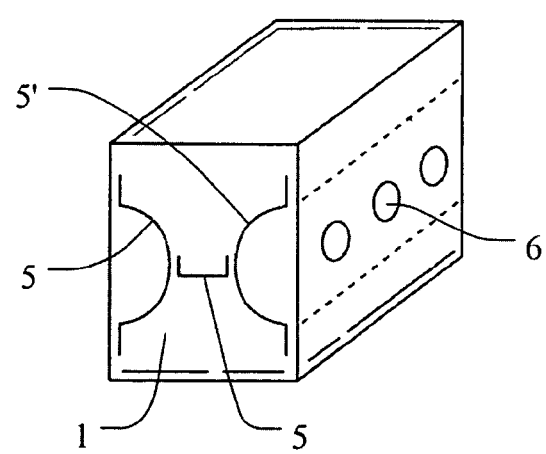
Fig. 5c
Fig. 5d

AIRBAG SYSTEM

CROSS REFERENCE TO RELATED APPLICATIONS

This application claims priority to PCT Patent Application Number WO 2006/128591 filed on May 18, 2006 and DE Patent Application Number 10 2005 025 553.1 filed on Jun. 1, 2005.

FIELD OF THE INVENTION

The invention relates to an airbag arrangement in a motor vehicle for protection of vehicle occupants.

BACKGROUND OF THE INVENTION

U.S. Pat. No. 5,172,790 describes, among other things, an airbag which is arranged within a center console between two car seats. After the gas generator is triggered, the airbag unfolds and pushes itself, balloon-shaped, between the seats and the seat occupants. To this end, the airbag is arranged in a housing inside the center console.

From DE 100 07 343 A1, there is known a safety device for occupants of a vehicle in which an airbag arrangement is arranged in the vicinity of the center tunnel of the vehicle between two neighboring seating positions. To this end, the airbag serves for rollover protection and extends above the heads of the vehicle occupants.

SUMMARY OF THE INVENTION

The object of the present invention is to provide an airbag arrangement that requires as little usable space as possible within a vehicle and ensures a rapid and precise opening and unfolding of the airbag.

According to the invention, this object is achieved by an airbag arrangement in a motor vehicle, said airbag arrangement comprising an airbag and a gas generator, which fills the airbag with gas after being activated, wherein the airbag is arranged between two neighboring seating positions for vehicle occupants by arranging the airbag in an openable lid of a center console or an armrest. It is thereby possible to unfold the airbag in the direct proximity of the vehicle occupants or seat users so that contact to the vehicle occupants can be established very quickly. In addition, the airbag serves as cushion so that the lid can be comfortably used as an armrest. The openable nature of the lid makes it possible to provide, within the center console or in the armrest, a storage space that can be used to store objects. The arrangement of the airbag in an openable armrest causes the armrest to be shut and the airbag to extend between the seat users, even if the armrest is open when the gas generator is triggered.

A further development of the invention provides that the gas generator is also arranged in or on the lid of the center console, so that the lid can be delivered and mounted together with the airbag and gas generator as a complete module.

In an arrangement of the gas generator in or on the lid of the center console or armrest, it is provided that the airbag may be arranged above the gas generator to further function as padding wherein, when in its folded-up state, the airbag is surrounded by a covering which has at least one predetermined tear line so that the airbag can easily escape from the covering at a particular location while inflating. To support tearing of the tear line and the opening action, at least one hinge, such as for example a living hinge or film hinge, is configured in the covering so that the covering folds open along the film hinge or film hinges after the predetermined tear line has split. A cushioning layer, which cooperates with the predetermined tear line, can be provided above the airbag.

For securing the arrangement of the airbag on the center console or armrest, the airbag may be fastened on the lid to form a base surface, so that the unfolded airbag can be held in position when inflated. This is advantageous compared to a punctiform or linear fastening. If the base surface is rectangular, the airbag may unfold having a correspondingly pillar-shape above this base surface. In one example, the airbag is fastened by a frame to the lid, such as by screwing down the frame to the lid or fastened thereto by another positive-fit connection, such as a clip connector.

For safe-guarding the abdominal area of the seat user or users, it is provided that at least one retaining strap, which keeps the airbag from bulging in the direction of the user, is arranged in the airbag. Preferably, in the event of a side impact, the airbag is arranged between two seat users and intercepts or prevents the user from sliding laterally out from the diagonal shoulder strap and to further couple the seat user to the seat. To this end, it is not necessary to support the abdominal area, but rather to provide for rapid positioning of the airbag to the shoulder area. To optimize the use of the inflating gas, the retaining straps are arranged in such a manner that a relatively narrow airbag, which widens upwards and preferably comes into contact initially with the chest area of the user, arises in the vertical direction. To this end, it is provided that a base region, the vertical extension of which approximately covers the abdominal area of the seat user, is present directly above the lid of the center console or armrest. This preferably prevents the airbag from coming into contact with the abdominal area of the seat user. Above the base region, the airbag widens and becomes considerably wider than the width of the lid. The base region in this example is as wide as the lid on which the airbag is fastened.

It is also possible for the airbag to demonstrate a trapezoidal cross section in its unfolded state. The narrower base line of the trapezoidal cross section is arranged on the lid, and the wider base line is positioned on the side of the airbag facing away from the lid. The unfolded airbag thus has a small base surface, which is fixed to the lid, and a large base surface, which is assigned to the thorax area of the seat user. To this end, it is provided that the wider base line or the widened upper region of the airbag extends until underneath the shoulder area of the seat user, thus coming to rest on the chest area of the seat user.

An embodiment of the invention provides that the airbag has a filling pressure of at least 1 bar in its filled state. For example, the airbag may have a filling pressure of 1 bar to 3 bar with the size of the airbag being 6 liters to 15 liters. To prevent injury to any limbs supported on the center console or armrest, the airbag has a relatively slow unfolding time of more than 30 ms, wherein it is provided that the airbag and the gas generator are configured in such a manner that the airbag is filled with 1 bar of overpressure after 40 ms.

Since the airbag has more of a support function than a pillow function, no ventilation may be provided during the inflation process so that the airbag maintains its gas pressure for a relatively long time. The gas may slowly escape after the accident scenario due to permeation and leaks. The airbag may be connected to a control unit, which in turn may be connected to sensors, which sense a side impact and/or rollover. Moreover, a sensor connected to the control unit, can be provided for detecting occupants. In the event of a side impact, the airbag for example, would be activated if an occupant is sensed on the seat opposite the side of the impact. If no occupant is sensed, the airbag will not be activated.

BRIEF DESCRIPTION OF THE DRAWINGS

Example embodiments of the invention will be explained below using the attached drawings.

FIGS. 5a-g are various examples of arrangements of retaining straps within an airbag in accordance with the present invention.

DETAILED DESCRIPTION OF THE INVENTION

Figure 1:
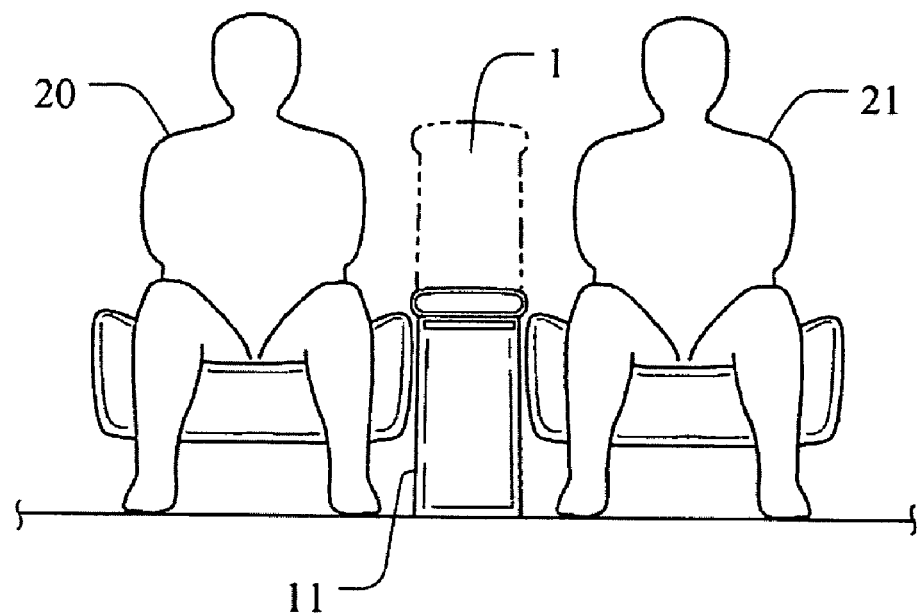
FIG. 1 is a front view of an arrangement of an airbag in a center console in accordance with an embodiment of the present invention.

FIG. 1 shows a possible representation of a motor vehicle with two vehicle occupants 20, 21, a center console 11 or an armrest being arranged between them. An airbag 1 together with a gas generator is attached in the upper region of the center console 11 or the armrest. The solid line shows the airbag 1 in its folded-up state, whereas the dashed line shows the airbag 1 in its unfolded state. After the gas generator is triggered, the airbag 1 unfolds upwards in the vertical direction and extends between the seat users 20, 21, the cross section of the airbag 1 being configured T-shaped or mushroom-shaped so that the upper region of airbag 1 is wider than the lower region. This enables it to rapidly make contact with the chest area of the seat users 20, 21.

Figure 2:
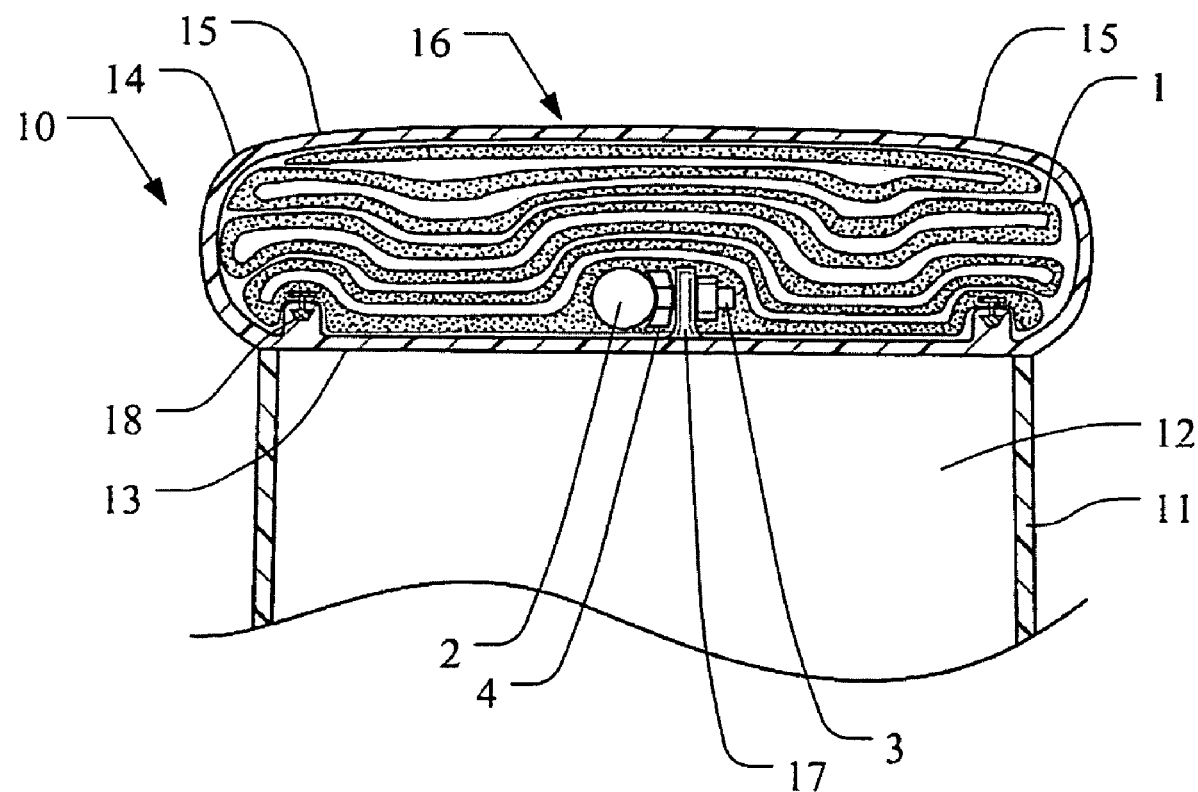
FIG. 2 is a cross sectional view of a folded-up airbag in accordance with another embodiment of the present invention.

FIG. 2 depicts a detailed representation of the arrangement of an airbag 1 in a lid 10 of a center console 11. The lid 10 includes a base plate 13, an airbag 1 being fastened to the base plate 13 by clip connectors 18 or screws. From the base plate 13, a covering 14 extends around the folded-up airbag 1. A predetermined tear line 16 is configured within the covering 14 in the longitudinal direction and consequently in the direction of travel of the motor vehicle. Film hinges 15 are configured parallel thereto on the edge of the lid 10 on both sides to facilitate opening of the covering 14 on both sides of the predetermined tear line 16. A gas generator 2 may be likewise enclosed in the covering 14 and is fastened to the lid 10 by means of a bolt 3 and a separator 4 on a fixing pin 17, which may be integrally joined to the base plate 13. As an alternative to a direct fastening of the airbag 1 by clip connectors 18, fastening by a surrounding frame, which can be screwed to the lid 10, is possible. This will ensure a continuous fastening of airbag 1 to the lid 10 while forming a base surface of airbag 1. The airbag 1 may have a stable base surface in its unfolded state.

The lid 10 is configured openable on the center console 11 and closes a hollow space 12, which can be used to accommodate objects. The fully assembled lid 10 with airbag 1, gas generator 2 and covering 14, can be delivered as a complete module. The folded-together and folded airbag 1 may serve as cushion for padding the gas generator 2. Alternatively, a separate padding may also be provided with the folded airbag 1 acting as an additional cushion.

Figure 3:
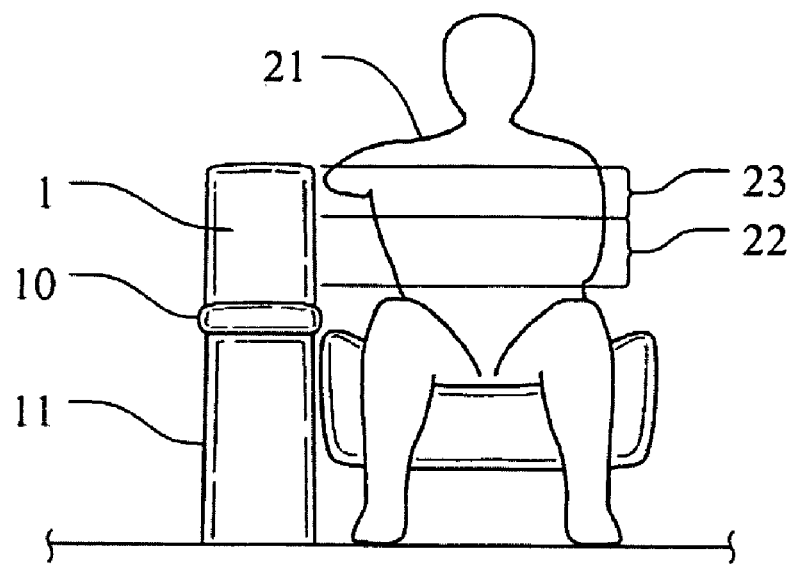
FIG. 3 is a front view of the airbag in accordance with yet another embodiment of the present invention.
Figure 4:
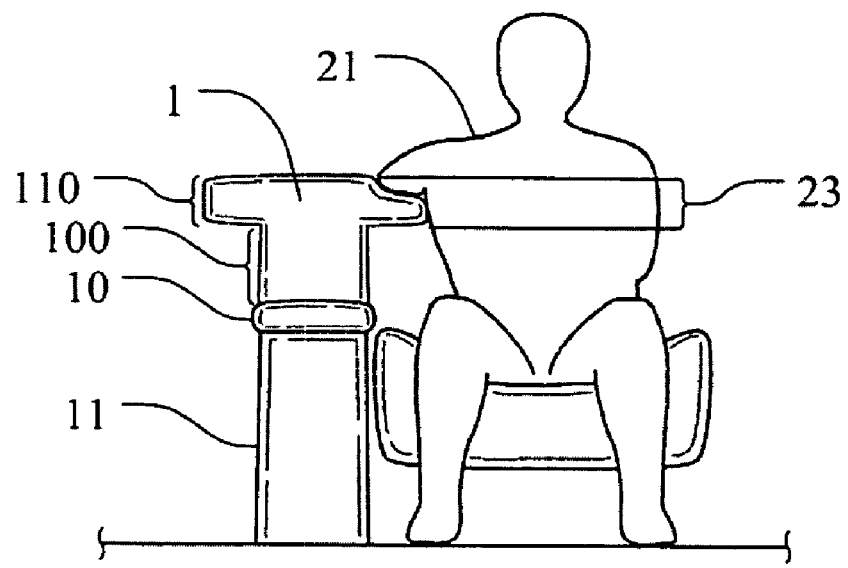
FIG. 4 is a front view of the airbag in accordance with another embodiment of the present invention.

FIGS. 3 and 4 depict the airbag 1 in its unfolded state, in which the airbag 1 extends in the vertical direction above lid 10 and above center console 11. In the embodiment illustrated in FIG. 3, the width of the airbag is equal to about the width of lid 10, which means that an essentially box-shaped airbag shoves itself between the seat users 20, 21 and nearly fills up the intermediate space between the upper bodies of the seat users 20, 21. Due to the physiological factors of a seat user 21, the airbag 1 is therefore closer to the chest area 23 of a seat user 21 than to the abdominal area 22 of the seat user 21. This preferably prevents the section of airbag 1 assigned to the abdominal area 22 from coming into contact with the seat user 21 before contact occurs with the chest area.

In another example, which is depicted in FIG. 4, the airbag 1 has a T-shaped cross section, in which a base region 100, which fits directly above the lid 10, has the width about equal to that of the lid 10, whereas a contact region 110 widens laterally and thus in the unfolded state comes into contact with the chest area 23 of a seat user 21 or seat users 20, 21 when in a normal seating position. If the vehicle is impacted from the left as per FIGS. 3 and 4, then without the airbag 1, the seat user 21 would remain in place because of his/her inertia, while the vehicle as a whole would move to the right. Because of the diagonal arrangement of the shoulder strap, which is not illustrated, there exists the possibility that the seat user 21 will slip out of the shoulder strap and strike the seat user 20 seated next to him/her without slowing down. Airbag 1, which holds the seat user 21 in his/her seating position, preferably provides separation between the adjacent seat occupants.

Figure 5E:
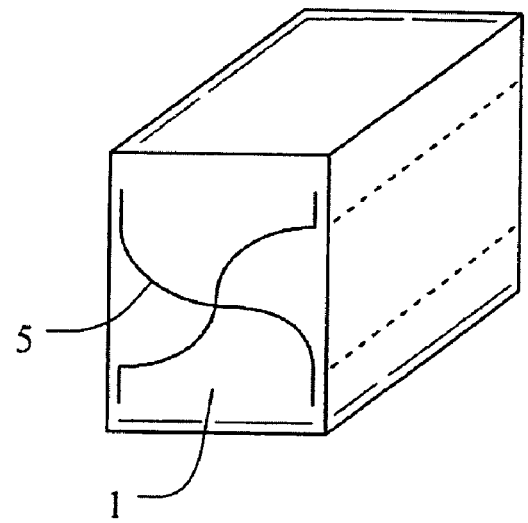
Figure 5F:
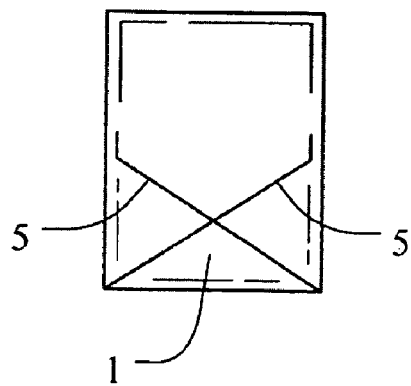
Figure 5G:
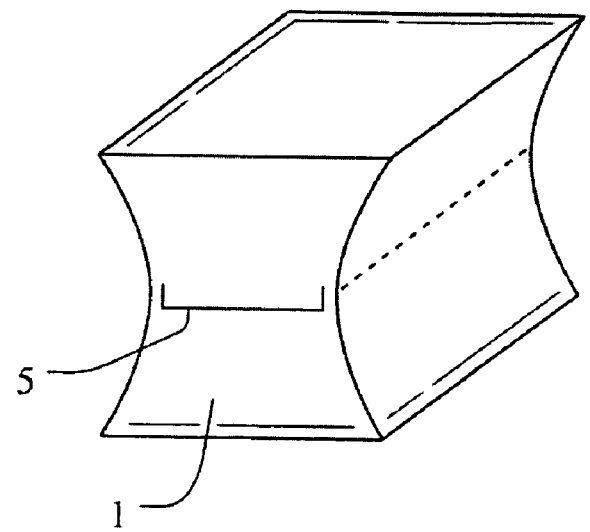

In order to design the shape of airbag 1 according to requirements in its unfolded state, FIGS. 5a to 5g illustrate various examples of the airbag 1. The retaining straps 5 are basically configured in such a manner that bulging of airbag 1 outwards in the inflated state is prevented, the dimensions being chosen in such a manner that, if necessary, there is constriction in the abdominal area 22 or at the height of the abdominal area 22, as indicated in FIG. 5g. A plurality of retaining straps 5 can be arranged within the airbag 1. The variant as per FIG. 5f with crossed retaining straps 5 has the advantage that they additionally stabilize the airbag 1, since the retaining straps 5 may be fastened to the lid 10. A plurality of retaining straps 5 can be provided in the airbag 1, as depicted in FIGS. 5b to 5f. Retaining straps 5 that cross each other, as depicted in FIGS. 5e and 5f, may increase the stability of airbag 1. The arrangement of holding retaining straps 5', as in FIGS. 5c and 5d, to which a retaining strap 5 is fastened, may reduce the volume to be inflated and accelerates the inflation of the airbag 1 in the thorax area 23. The holding retaining straps 5' can limit the unfolding height or make the area of the airbag 1, corresponding to the abdominal area 22 less hard. Ventilation holes 6 can also be provided in airbag 1.

In at least one embodiment, the gas generator 2 and airbag 1 are configured in such a manner that a relatively slow unfolding and slow filling of airbag 1 with the gas will occur. Whereas a normal unfolding rate in a side airbag is 10 ms to 15 ms, an unfolding time of more than 30 ms may be provided for the airbag 1. This permits body parts, such as arms, placed on the lid 10 to be pushed to the side relatively gently during the unfolding without danger of causing an injury. The provided airbag arrangement can be configured in such a manner that the airbag is filled with 1 bar of overpressure after 40 ms with a maximum pressure of 3-5 bar being provided for an airbag sized 6 liters to 15 liters, but preferably 8 liters to 12 liters.

The airbag can also be activated when lid 10 is in its opened state, the activation of airbag 1 shutting lid 10 and locking it again to the center console 11 or armrest in a conventional manner. Because of the shutting of lid 10, the airbag 1 automatically moves into the desired position between the vehicle occupants 20, 21.

The shutting can either occur automatically when the airbag is activated or occur during the activation by means of active shutting. Active shutting in turn can be accomplished by means of a separate activator (motor) and by a lever mechanism, which is actuated by the airbag or the gas flow from the gas generator.

Since the airbag is filled with a relatively high gas pressure, the material forming the airbag must be configured relatively resistant and dense. A dense, heavy fabric with a coating on the inside can be used, for example. Alternatively, the airbag can be formed out of metal or plastic. The folded wall regions would selectively deform in this case.

As a person skilled in the art will appreciate, the above description is means as an illustration of implementation of the principles of this invention. This description is not intended to limit the scope or application of this invention in that the invention is susceptible to modification, variation and change, without departing from the spirit of this invention, as defined by the following claims.

The invention claimed is:

1. An airbag arrangement in a motor vehicle comprising, a vehicle center console having an airbag and a gas generator that fills the airbag with gas after being activated to inflate the airbag from a folded-up state to an inflated state, the airbag being disposed between two adjacent seats for vehicle occupants, wherein the airbag is stored in the folded-up state in a lid of the center console, the lid having a base surface, and the airbag fastened to the base surface and a gas generator disposed within the lid for generating inflation gas, a covering enclosing the airbag and deforming to permit the airbag to deploy upwardly through the covering, the airbag, the lid, the base surface, and the covering fastened such as to move together therewith when the lid of the center console moves between a closed position which encloses a hollow space below the lid for accommodating objects and an open position which exposes the hollow space to permit access to the objects.

2. The airbag arrangement according to claim 1, wherein when the airbag is in the folded-up state, the airbag is disposed above the gas generator.

3. The airbag arrangement according to claim 1 further comprises a frame, and wherein the airbag is fastened to the lid by the frame.

4. The airbag arrangement according to claim 1 further comprising a cover, and wherein when the airbag is in the folded-up state, the airbag is surrounded by the cover that has at least one predetermined tear line formed therein.

5. The airbag arrangement according to claim 4, wherein at least one film hinge is formed in the cover.

6. The airbag arrangement according to claim 1 further comprising at least one retaining strap configured to prevent the airbag from bulging in a direction of one of the vehicle occupants when seated in one of the seats, the retaining strap being disposed in the airbag.

7. The airbag arrangement according to claim 1, wherein the airbag has a base region that has a vertical extension corresponding to an abdominal area of one of the vehicle occupants when seated in one of the seats, the airbag in the inflated state having a width which is substantially the same as the width of the lid.

8. The airbag arrangement according to claim 7, wherein the airbag in the inflated state is wider above the base region in a direction of one of the vehicle occupants when seated in the one of the seats.

9. The airbag arrangement according to claim 1, wherein the airbag has a trapezoidal cross section in the inflated state, with a narrower base line disposed adjacent the lid and a wider base line being disposed opposite the narrower base line.

10. The airbag arrangement according to claim 9, wherein an end portion of the airbag having the wider base line formed therein extends towards one of the vehicle occupants when seated in one of the seats.

11. The airbag arrangement according to claim 1, wherein the airbag is one of clipped and screwed to the lid.

12. The airbag arrangement according claim 1, wherein the airbag has a filling pressure of at least 1 bar greater than atmospheric pressure when in the inflated state.

13. The airbag arrangement according to claim 1, wherein the airbag has a volume in the range of about 6 to 15 liters.

14. The airbag arrangement according to claim 1, wherein the airbag has an unfolding time of more than about 30 ms for inflation from the folded-up state to the inflated state in response to activation of the gas generator.

15. The airbag arrangement according to claim 1, wherein the airbag and the gas generator are configured such that the airbag is filled with at least about 1 bar of overpressure only after more than 40 ms after activation of the gas generator.

* * * * *